June 16, 1953     A. G. LADRACH     2,641,841
ELECTROMAGNETIC GAUGING EQUIPMENT
Filed Jan. 28, 1948     3 Sheets-Sheet 1
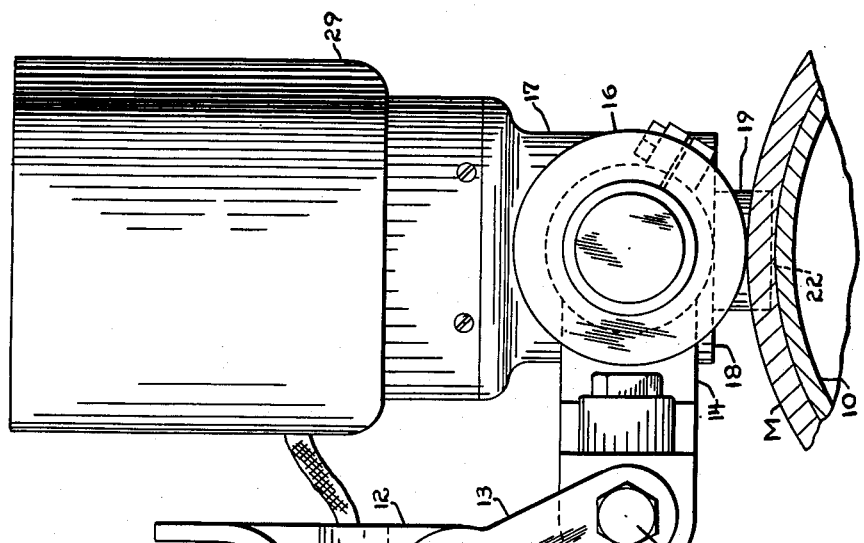
FIG. 1
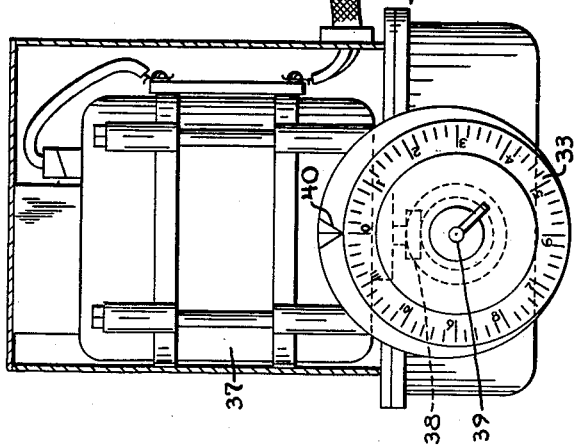
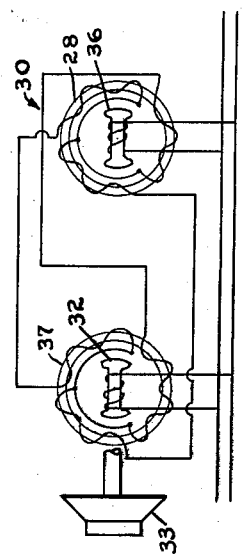
FIG. 2
INVENTOR.
AARON G. LADRACH, DECEASED, BY
DOROTHY B. LADRACH, ADMINISTRATRIX
BY
Joseph K. Schofield
Attorney

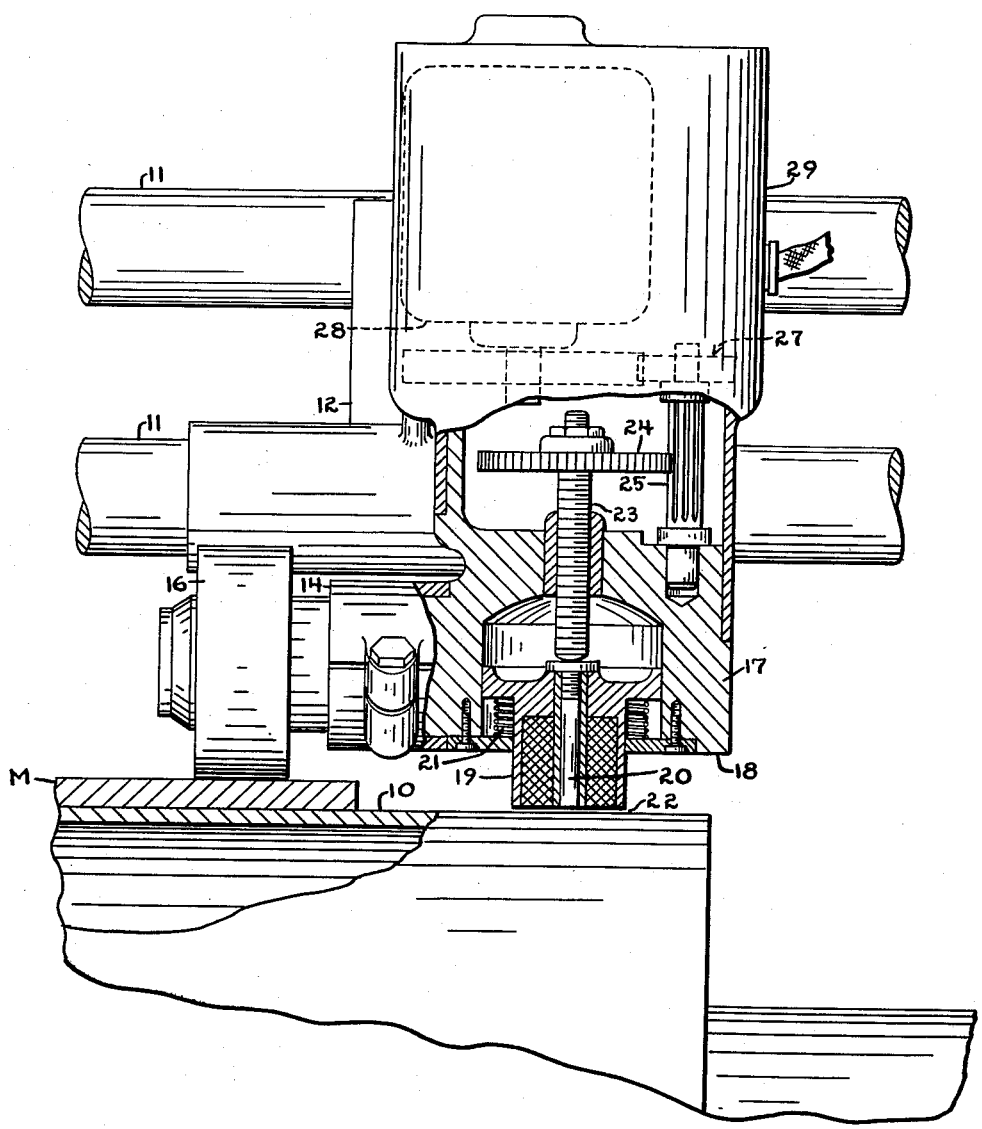

June 16, 1953     A. G. LADRACH     2,641,841
ELECTROMAGNETIC GAUGING EQUIPMENT

Filed Jan. 28, 1948     3 Sheets-Sheet 3

INVENTOR.
AARON G. LADRACH, DECEASED, by
DOROTHY B. LADRACH, ADMINISTRATRIX
BY
Joseph K Schofield
Attorney Patented June 16, 1953

2,641,841

UNITED STATES PATENT OFFICE 2,641,841

ELECTROMAGNETIC GAUGING EQUIPMENT

Aaron G. Ladrach, deceased, late of Akron, Ohio, by Dorothy B. Ladrach, administratrix, Akron, Ohio, assignor, by mesne assignments, to Niles-Bement-Pond Company, West Hartford, Conn., a corporation of New Jersey Application January 28, 1948, Serial No. 4,834

3 Claims. (Cl. 33—147)

This invention relates to electromagnetic gauging equipment.

Heretofore gauging equipment has been provided wherein an electromagnet was mounted to provide a working air-gap of predetermined magnitude which was varied according to variations in thickness, for example, of sheet material being continuously gauged, and these variations in the magnitude of the air-gap were manifested on a meter or recording device through a suitable electrical balancing or "Wheatstone bridge" circuit. The electromagnetic devices utilized for this purpose have usually included a coil or coils, connected in such a balancing circuit, and an armature associated therewith from which magnetic flux of desired potential was passed across an air-gap to the surface of magnetic material being gauged, or as in the case of non-magnetic material, such as rubber sheeting, the flux passed through the rubber sheeting to a supporting roll of magnetic material over which the sheeting was engaged. It has been found, however, that although such magnetic gauges have had a satisfactory degree of accuracy for certain purposes, the accuracy was materially reduced as the magnitude of the working air-gap of the electromagnet increased above a certain point. As an example, when the electromagnet was supported over relatively thick rubber sheeting, the accuracy of the ordinary gauge was materially reduced.

It has also been found that when electromagnetic gauges were used for gauging hot steel or rubber resulting variations in atmospheric temperatures affected the accuracy of the gauge so as to require adjustments of the electromagnet from time-to-time, and because of the heat from the material, operators of the equipment have been either unable or unwilling to go close enough to the gauge to make such adjustments.

One object of this invention is to provide an electromagnetic gauge of the type described, wherein is provided improved remote control means for adjusting the electromagnet to set the working air-gap for continuous gauging operations, thereby eliminating the necessity for the operator to handle the gauge for making such adjustments.

Another object of the invention is to provide an improved electromagnetic measuring gauge wherein the electromagnet thereof is adapted to be supported directly on the material to be gauged whether magnetic or non-magnetic, to provide a working air-gap between the electromagnet and a fixed magnetic element, and wherein the arrangement is such that the air-gap will be variable from predeterminately adjusted working magnitude, only by variations in the thickness of the material, that is without being affected by variations in the surface of the supporting roller over which the material is passed for gauging.

Still another object of the invention is to provide gauging equipment of the character described, including remotely controlled means for setting the equipment for gauging continuous material of given required gauge, or changing the setting for material of another given gauge, without necessarily requiring the use of checking tools, feeler gauges, or the like.

These and other objects of the invention will be manifest from the following brief description and the accompanying drawings.

Of the accompanying drawings:

Figure 1 is a side elevation, partly broken away and in section, illustrating gauging equipment arranged for continuous gauging of sheet steel in a steel mill.

Figure 2 is a schematic wiring diagram of a Selsyn device incorporated in the equipment of Figure 1.

Figure 3 is a front elevation, partly broken away and in section, of the electromagnet gauging unit of the equipment, as viewed from the right of Figure 1.

Figure 5:
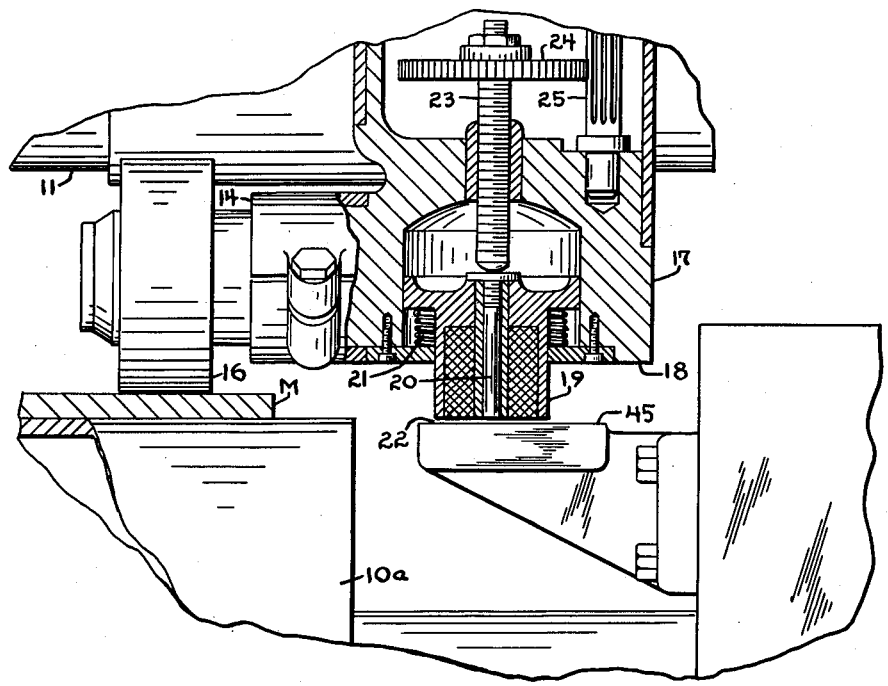
Figure 5 is a view similar to a part of Figure 1, illustrating another form of the invention.

Referring particularly to the form of the invention shown in Figures 1 to 4 of the drawings, the numeral 10 designates a roll, of magnetic material, which may be a roll associated with material processing equipment of a steel mill, and over which the material M is continuously fed, the material being held in snug engagement with the upper surface portion of the roll by suitable tensioning means (not shown), to facilitate accurate gauging operations.

Above and in advance of roll 10 is a pair of transversely extending supporting bars 11, 11 one above the other, along which is slidably adjustably mounted a support 12. This support includes a downwardly extending, rigid arm 13 on which a gauging carriage 14 is pivoted at 15 to extend toward the path of movement of the material M (see Figure 1). The carriage is supported by a roller 16 journaled thereon to be in rolling engagement with the surface of the material M above said upper surface portion of roll 10, the arrangement being such that a housing 17 on the carriage is supported to have a bottom face 18 thereof at a distance from the top surface of roll 10 determined by the thickness of the material being gauged (see Figure 3), and spaced laterally from one side edge of the material M.

Vertically slidably received in the bottom of housing 17 may be receptacle 19 in which is an electromagnet 20, the receptacle being vertically adjustable with respect to the housing against the action of spring means 21 to provide a space or air-gap 22 between the electromagnet and the bare top surface of roll 10. For so vertically adjusting the receptacle, a stem 23 is threaded in the housing 17 above the electromagnet, to have the lower end thereof engaging the top of receptacle 19, whereby upon turning the stem on its threads the receptacle may be set to provide a given space or air-gap between the surface of roll 10 and the bottom of the electromagnet.

Because of high temperatures in the environment of the gauge, due to heat from the material M or from the equipment by which it is processed, it may be undesirable or objectionable for the operator to make direct manual adjustments of the electromagnet in the housing 17, as may be necessary from time-to-time. To obviate this difficulty, and for other purposes to be described later, the stem 23 has a gear 24 fixed thereon for meshing engagement with a toothed spindle 25 which is adapted to be rotated, through a gear reduction mechanism 27, by a motor 28 mounted in an upward extension 29 of housing 17. The motor is connected in an electrical circuit of a Selsyn device, indicated generally at 30, in Figure 2, which also includes a generator 37 synchronized with the motor, the arrangement being such that the slightest angular movement of the armature 32 of the generator, accomplished manually by means of a rotatable dial 33 on the casing 34 of the generator, a corresponding angular movement will be transmitted to the armature 36 of motor 28, and through the reduction gearing 27, spindle 25, gear 24, and threaded stem 23, the electromagnet 20 will be moved vertically to adjust the magnitude of the air-gap 22. The movement of the dial 33 is transmitted to the generator armature through a suitable reduction mechanism at 38. The dial 33 is adapted to be releasably locked in various positions of angular adjustment with respect to the stem or shaft 39 on which it is mounted for rotating said generator armature, whereby graduations on the dial may be utilized to indicate various thicknesses or measurements in fractions of an inch, or otherwise as necessary or desirable, by means of a fixed index mark 40 on the generator housing. That is, the dial may be utilized for setting the air-gap 22 of the electromagnet to suit any given gauge of material to be continuously gauged, as will be more completely described later. Thus, the generator unit of the Selsyn device may be at a point remote from the motor unit 28 thereof on the gauge carriage.

Figure 4:
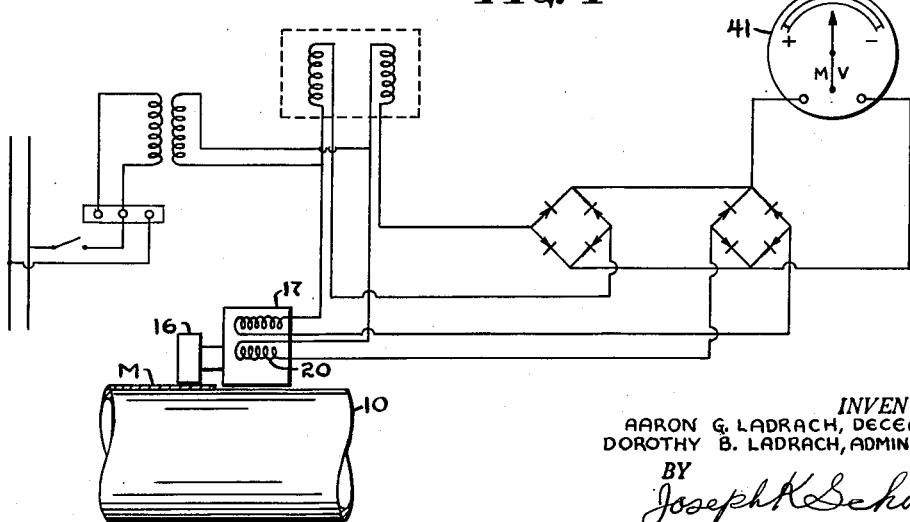
Figure 4 is a diagram of a suitable wiring circuit in which the gauging equipment is connected, and including a galvanometer for indicating variations in thickness of material being gauged.

Variations in given thickness of material M will, of course, vary the magnitude of the air-gap 22 accordingly, because the carriage for the electromagnet is supported by the material. The resultant variations in the magnetic flux across the air-gap is utilized to measure the thickness variations of the material within desired limitations which may be, for example, within .010 inch, by the electromagnet being connected in a suitable "Wheatstone bridge" or balancing circuit of known type, as shown in Figure 4. A similar circuit is shown and described in the prior patent of Aaron G. Ladrach, No. 2,438,506 issued on March 30, 1948. The circuit of Figure 4 herein includes a meter 41, which will indicate or record a zero reading so long as the material is of required gauge, or thick and thin variations from required gauge as the magnitude of the air- gap 22 varies from an arbitrarily determined working gap of .025 inch, as an example.

In operation of the equipment of Figures 1 to 4, for continuous gauging of sheet material M, the initial settings of the equipment are made, for example, by first placing supporting roller 16 of the gauge carriage 14 directly upon the bare top surface of roll 10, and operating the Selsyn device by turning dial 33 to adjust the electromagnet 20 in housing 17 until a given working air-gap 22, of say .025 inch, is provided between the bottom of the electromagnet and the roll, which dimension may be tested with a feeler gauge in known manner. When this working air-gap of .025 inch has been set, the bridge circuit (see Figure 4) is adjusted in known manner to be in balance, with a zero reading on the meter 41. When once these initial settings have been made, all further settings may be made by remote control, by means of the Selsyn device, to accommodate any given thickness of material to be gauged, and without necessarily requiring the further use of a feeler gauge or other testing tool, at any time. That is, with the gauge carriage and housing 17 thereon thus fixedly positioned with respect to the bare top surface of roll 10 the adjusting dial 33 is unlocked and turned on its stem 39 until the indicating mark 40 is opposite the zero reading on dial 33 (see Figure 1), and then the dial is relocked on said stem. The gauge carriage may now be positioned to be supported by the material M fed over the roll 10, the roller 16 of the carriage then being in frictional engagement with said material, after which the dial 33 is turned until index 40 indicates the exact given thickness of the material required. In the last-named position of the carriage the electromagnet will first be spaced from roll 10 a distance equal to the thickness of the material plus the given working gap of .025 inch, but by said adjustment of the dial 33 to indicate the desired material thickness the air-gap will again have been reduced to .025 inch, assuming that the material M is "on-gauge" as indicated by a zero reading on meter 41. If the material M is "off-gauge" the amount will be indicated by a "thick" or "thin" reading on the meter 41. In other words, whether or not the material M is off correct gauge the Selsyn dial will now indicate the given or required thickness thereof. The above suggested procedure for adjusting the equipment for continuous gauging may, of course, be varied to a considerable extent.

At all times when the material continuously fed over roll 10 is of correct gauge of one inch the air-gap 22, of course, will remain at .025 inch, and the reading on the meter 41 will remain at zero. Should the thickness vary above and below one inch, the magnitude of the air-gap 22 will be accordingly increased or decreased, and the corresponding change in magnitude of the flux across the air-gap will be manifested by unbalancing of the "Wheatstone bridge" circuit, and indicated on the meter 41. These changes in thickness of the material, of course, have no effect on the Selsyn device or the reading (one inch) on the dial 33 thereof.

It will be readily understood, therefore, that if it is decided, as an example, to gauge material of half inch thickness instead of one inch it will only be necessary to turn the dial 33 to indicate one half inch, which through operation of the Selsyn device will move the electromagnet up a corresponding half inch, and when the gauge carriage 14 is supported on material of correct half inch gauge the air-gap will be .025 inch, and the "Wheatstone bridge" circuit will again be in balance, ready for continuous gauging as before. In other words, any time it is desired to change the equipment for gauging material of a different thickness, it is only necessary to move the dial 33 to indicate the required thickness, and so long as the working air-gap (.025 inch) is correct when the gauge carriage is supported on the material of correct gauge the meter 41 will indicate zero. This feature eliminates any necessity for an operator going close to the gauging carriage, and obviates the use of feeler gauges or checking tools for setting the electromagnet.

It will be readily seen that the gauging equipment described above may be utilized for continuous gauging of non-magnetic material, such as rubber, equally as well as metal. Also, the equipment may be utilized for gauging magnetic material by supporting the roller 16 directly on the roll 10 and providing the working air-gap between the electromagnet and the surface of the material.

A modified form of the invention is illustrated in Figure 5 of the drawings, wherein all parts of the equipment contemplated will be the same as described above in connection with Figures 1 to 4, except that provision is made for obviating inaccuracies in the readings on meter 41 (Figure 4) due to irregularities in the magnetic qualities of those portions of the surface of roll 10 where the magnitudes of air-gap 22 are measured by the "Wheatstone bridge" circuit. Like parts are, therefore, given like numerals for identification.

Roller 16 engages the material M, as before, but supports the carriage so that the electromagnet 20 will be spaced from the surface of a fixed plate or element 45, instead of from a bare portion of the supporting roll 10a. In this construction the plate 45 is easily provided with a permanent, uniformly level and smooth upper surface, and hence in continuous gauging operations the magnitude of the air-gap 22 will always be the same as long as material M being gauged is of desired uniform thickness. The adjustment and operation of this form of the invention is otherwise as described in connection with Figures 1 to 4.

In all forms of the invention as described it is possible to maintain the magnitude of the working air-gap of the electromagnet at a minimum, .025 inch as an example, even though the material being continuously gauged may be relatively thick, and hence accuracy of the electromagnet is maintained at a maximum. It will also be readily seen that the construction described has a distinct advantage in that a single gauging unit may be adapted for use for a wide range of purposes which formerly required provision of separate gauging units.

Other modifications of the invention may be resorted to without departing from the spirit thereof or the scope of the appended claims.

What is claimed is:

1. The combination in an electromagnetic gauging device, of a rotatable support over which material to be gauged is passed, a holder, an electromagnet adjustably mounted in said holder, a relatively fixed element of magnetic material adjacent said electromagnet, a member engageable upon the material being gauged, said member movably supporting said holder with its electromagnet in spaced relation to said magnetic element and thereby providing a variable air-gap between the magnetic element and said electromagnet, variations in thickness of the material thereby correspondingly varying the magnitude of said air-gap, and means responsive to said air-gap variations for manifesting the variations in material thickness.

2. The combination in an electromagnetic gauging device for continuous gauging of sheet or strip material while in motion, of a supporting roller over which material to be gauged is passed, a holder, an electromagnet adjustably mounted in said holder, a relatively fixed element of magnetic material, a roller riding on the material to be gauged and supporting said holder with its electromagnet in spaced relation to said magnetic element to provide an air-gap between the magnetic element and said electromagnet whereby variations in thickness of the material will correspondingly vary the magnitude of said air-gap, and means responsive to said air-gap variations for indicating the variations in material thickness.

3. An electromagnetic gauge for gauging the thickness of strip material while in motion, comprising an electro-magnetic coil, a supporting roller over which material to be gauged is passed, a fixed magnetic element, means for mounting said coil to be movable by the material toward and from said fixed magnetic element correspondingly in response to variations in thickness of the material being gaged, said mounting means including a holder having a member riding on the movable strip material and in which said electromagnet is shiftably received, adjusting means for shifting said electro-magnet with respect to said holder, a Selsyn motor operatively connected to said adjusting means to position the electro-magnet within the holder to a predetermined setting, a Selsyn generator in a Selsyn circuit with said motor, manual means for actuating said generator and thereby correspondingly actuating said motor and through said adjusting means shifting the electromagnet in said holder relatively to and from said fixed magnetic element to provide an air-gap between said element and coil, said air-gap being variable in magnitude with said movements of the coil, and electrical means for manifesting said variations in said variable distances by means of said variations in the air-gap.

DOROTHY B. LADRACH,
*Administratrix of estate of Aaron G. Ladrach, deceased.*

References Cited in the file of this patent

UNITED STATES PATENTS

| Number | Name | Date |
|---|---|---|
| 868,813 | Scheibenstock | Oct. 22, 1907 |
| 1,946,924 | Allen et al. | Feb. 13, 1934 |
| 2,115,351 | Terry et al. | Apr. 26, 1938 |
| 2,146,442 | Price | Feb. 7, 1939 |
| 2,177,009 | Terry et al. | Oct. 24, 1939 |
| 2,281,453 | Petersen | Apr. 28, 1942 |
| 2,308,033 | Terry et al. | Jan. 12, 1943 |
| 2,381,990 | Stevens | Aug. 14, 1945 |
| 2,438,506 | Ladrach | Mar. 30, 1948 |
| 2,503,720 | Gieseke | Apr. 11, 1950 |

OTHER REFERENCES

General Electric Selsyns (GEA-2176; 8-35 (5m), Filing No. 8490), pamphlet—8 pages.